US009150219B2

(12) United States Patent
Wang et al.

(10) Patent No.: US 9,150,219 B2
(45) Date of Patent: Oct. 6, 2015

(54) HYBRID ELECTRIC VEHICLE AND METHOD OF STARTING ENGINE

(71) Applicant: FORD GLOBAL TECHNOLOGIES, LLC, Dearborn, MI (US)

(72) Inventors: Xiaoyong Wang, Novi, MI (US); Wei Liang, Farmington Hills, MI (US); Rajit Johri, Ann Arbor, MI (US); Mark Steven Yamazaki, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/186,076

(22) Filed: Feb. 21, 2014

(65) Prior Publication Data
US 2015/0239467 A1    Aug. 27, 2015

(51) Int. Cl.
*B60W 10/08* (2006.01)
*B60W 20/00* (2006.01)
*B60W 10/02* (2006.01)
*B60W 10/06* (2006.01)

(52) U.S. Cl.
CPC .............. *B60W 20/40* (2013.01); *B60W 10/02* (2013.01); *B60W 10/026* (2013.01); *B60W 10/06* (2013.10); *B60W 10/08* (2013.01); *B60W 20/10* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 6,176,808 B1 | 1/2001 | Brown et al. | |
| 6,308,794 B1 | 10/2001 | Oppitz | |
| 6,581,705 B2 | 6/2003 | Phillips et al. | |
| 7,131,510 B2* | 11/2006 | Mesiti et al. | 180/65.25 |
| 7,370,715 B2* | 5/2008 | Colvin et al. | 180/65.28 |
| 7,874,956 B2 | 1/2011 | Kouno | |
| 8,123,657 B2* | 2/2012 | Mittelberger et al. | 477/5 |
| 8,192,324 B2 | 6/2012 | Kraska et al. | |
| 8,246,509 B2* | 8/2012 | Mittelberger et al. | 477/5 |
| 8,430,777 B2 | 4/2013 | Yamada et al. | |
| 8,565,990 B2* | 10/2013 | Ortmann et al. | 701/67 |
| 8,574,125 B2* | 11/2013 | Nedorezov et al. | 477/169 |
| 2004/0045750 A1 | 3/2004 | Baraszu et al. | |
| 2011/0118915 A1 | 5/2011 | Ortmann et al. | |
| 2013/0072347 A1 | 3/2013 | Birkhold et al. | |
| 2014/0088805 A1* | 3/2014 | Tulpule et al. | 701/22 |

OTHER PUBLICATIONS

Motosugi, Jun, et al., "Development of a Slip Control System for RWD Hybrid Vehicles using Integrated Motor-Clutch Control", SAE International, Paper 2011-01-0945, Published Apr. 12, 2011, 7 pages, ISSN 0148-7191.
Hayasaki, Koichi, et al., "Development of a Parallel Hybrid System for RWD Vehicles", SAE International, Paper 2011-01-0884, Published Apr. 12, 2011, 17 pages, ISSN 0148-7191.

* cited by examiner

*Primary Examiner* — Dirk Wright
(74) *Attorney, Agent, or Firm* — David B. Kelley; Brooks Kushman P.C.

(57) ABSTRACT

Two methods may be used to start the engine of a hybrid electric vehicle while the vehicle is moving under electric power. When smoothness is most important, a disconnect clutch is partially engaged to initiate engine rotation and then released as the engine accelerates under its own power toward a motor speed. When rapid starting is most important, the disconnect clutch torque capacity is controlled to decrease the time required for the engine to accelerates to the motor speed. A torque converter bypass clutch is disengaged during the engine restart under either method. Also, the motor torque is adjusted under either method to compensate for the torque provided to the engine.

16 Claims, 5 Drawing Sheets

HYBRID ELECTRIC VEHICLE AND METHOD OF STARTING ENGINE

TECHNICAL FIELD

The present disclosure relates to the field of vehicle controls. More particularly, the disclosure relates to a method and apparatus for controlling the start of an engine in a hybrid electric vehicle.

BACKGROUND

The majority of automobiles are propelled by internal combustion engines burning fossil fuels. In such vehicles, the internal combustion engine must be running any time that power is required. The engine is typically started while the vehicle is in park using an electric motor provided specifically for that purpose. Until recently, it was common to start the engine at the beginning of a trip and not shut down the engine until reaching the destination. In recent years, hybrid electric vehicles have been introduced to the market. Hybrid electric vehicles are capable of propelling the vehicle using either the internal combustion engine or using a traction motor powered by electrical energy stored in a battery. One way that hybrid vehicles reduce fuel consumption is by shutting the engine off during periods when the motor propels the vehicle or when the vehicle is stopped. When it is necessary or desirable to resume using the internal combustion engine, the engine must be restarted. Often, the engine must be restarted while the vehicle is moving under electric power. Because restart events happen frequently and not necessarily in response to a driver action, the restarts must be smoother than traditional engine starts. Furthermore, some conditions call for a very rapid restart. Although traditional starter motors have adequate durability when used only once per trip, they may not have sufficient reliability if used every time a hybrid electric vehicle needs to start the engine.

SUMMARY

According to one embodiment, a method to start the engine of a hybrid electric vehicle includes propelling the vehicle with the motor while the engine is off, partially engaging a disconnect clutch to rotate the engine, disengaging the disconnect clutch and fueling the engine while the engine speed rises toward a target start speed, and then fully engaging the disconnect clutch. The engine may be controlled in a speed control mode as its speed increases toward the target speed and controlled in a torque control mode after its speed reaches the target speed. A torque converter bypass clutch may open or slip during the engine start process.

According to another embodiment, a method to start the engine of a hybrid electric vehicle includes using the motor to propel the vehicle with an open torque converter, partially engaging a disconnect clutch to transmit torque from the motor to the engine, and then fully engaging the disconnect clutch once engine speed reaches the motor speed. A torque converter bypass clutch may be engaged after the disconnect clutch is fully engaged. The disconnect clutch may be disengaged while the engine accelerates toward the motor speed under its own power. Alternatively, the disconnect clutch may remain partially engaged such that motor torque acts to increase the engine speed toward the motor torque more rapidly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
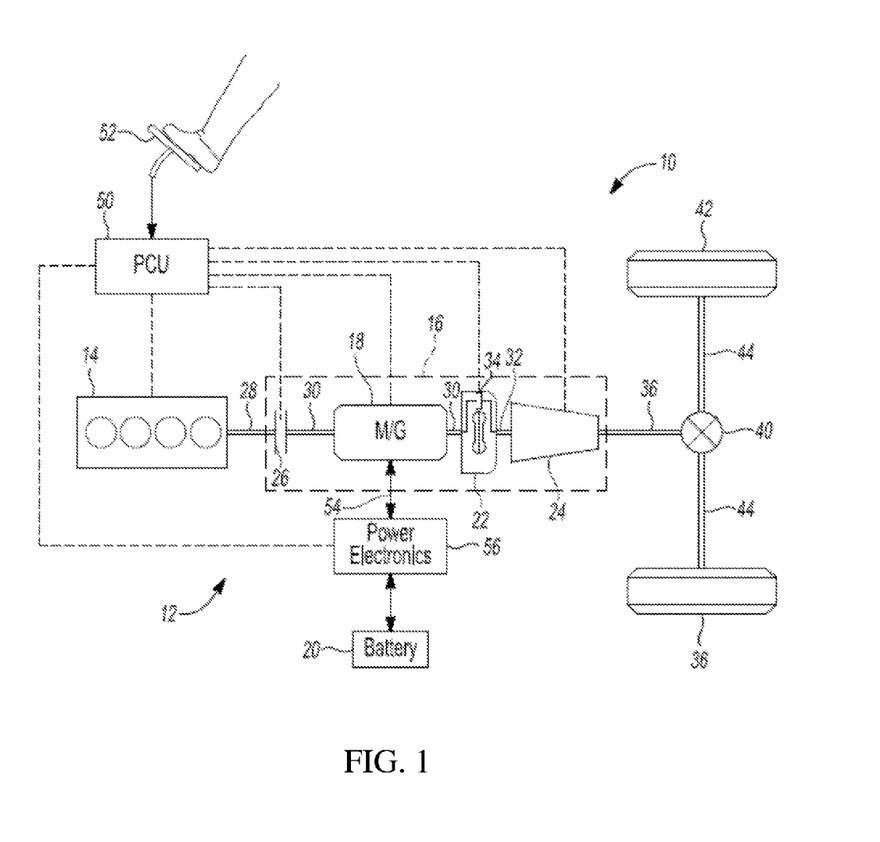
FIG. 1 is a schematic diagram of a hybrid electric powertrain.

Referring to FIG. 1, a schematic diagram of a hybrid-electric-vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

Disconnect clutch 26 may be in a disengaged state wherein negligible torque is transmitted between engine 14 and M/G 18, in a fully engaged state wherein engine 14 and M/G are constrained to rotate at the same speed, or in a partially engaged state wherein the speeds are different but torque is transmitted from the faster element to the slower element. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is fully engaged. Two rotating elements are drivably connected if rotation of one element forces the other element to rotate at a proportional speed.

The M/G 18 is connected to the torque converter 22 via shaft 30. The torque converter 22 is therefore connected to the engine 14 when the disconnect clutch 26 is engaged. The torque converter 22 includes an impeller fixed to M/G shaft 30 and a turbine fixed to a transmission turbine shaft 32. The torque converter 22 thus provides a hydraulic coupling between shaft 30 and turbine shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22 to one another, permitting more efficient power transfer.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and turbine shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 is but one example of a gearbox or transmission arrangement; any multiple ratio gearbox that accepts input torque(s) from an engine and/or a motor and then provides torque to an output shaft at the different ratios is acceptable for use with embodiments of the present disclosure.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, bypass clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, bypass clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

At any point in time, PCU 50 controls the engine in one of at least two control modes: torque control mode or speed control mode. In torque control mode, PCU sets the throttle opening, fuel flow, spark timing, etc. in an open loop fashion based on a target torque. In speed control mode, the PCU compares a measured engine speed to a target speed and adjust the engine torque accordingly, increasing torque when the engine speed is below the target speed and increasing torque when the engine speed is above the target speed.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28. Other configurations are contemplated without deviating from the scope of the present disclosure.

When the vehicle transitions from electric only mode to hybrid mode, the controller must start the engine 14. The vehicle may or may not have a dedicated starter motor. Even if a dedicated starter motor is present, the number of engine starts due to transitions from electric only mode may be excessive for typical starter motors leading to durability problems. Therefore, it is desirable to start the engine using M/G 18. However, diverting torque from M/G 18 to start the engine may disturb the torque to the vehicle wheels disturbing vehicle occupants. In some circumstances, it is necessary to transition to hybrid mode very rapidly. Control strategies that optimize smoothness may compromise speed and vice versa.

Figure 2:
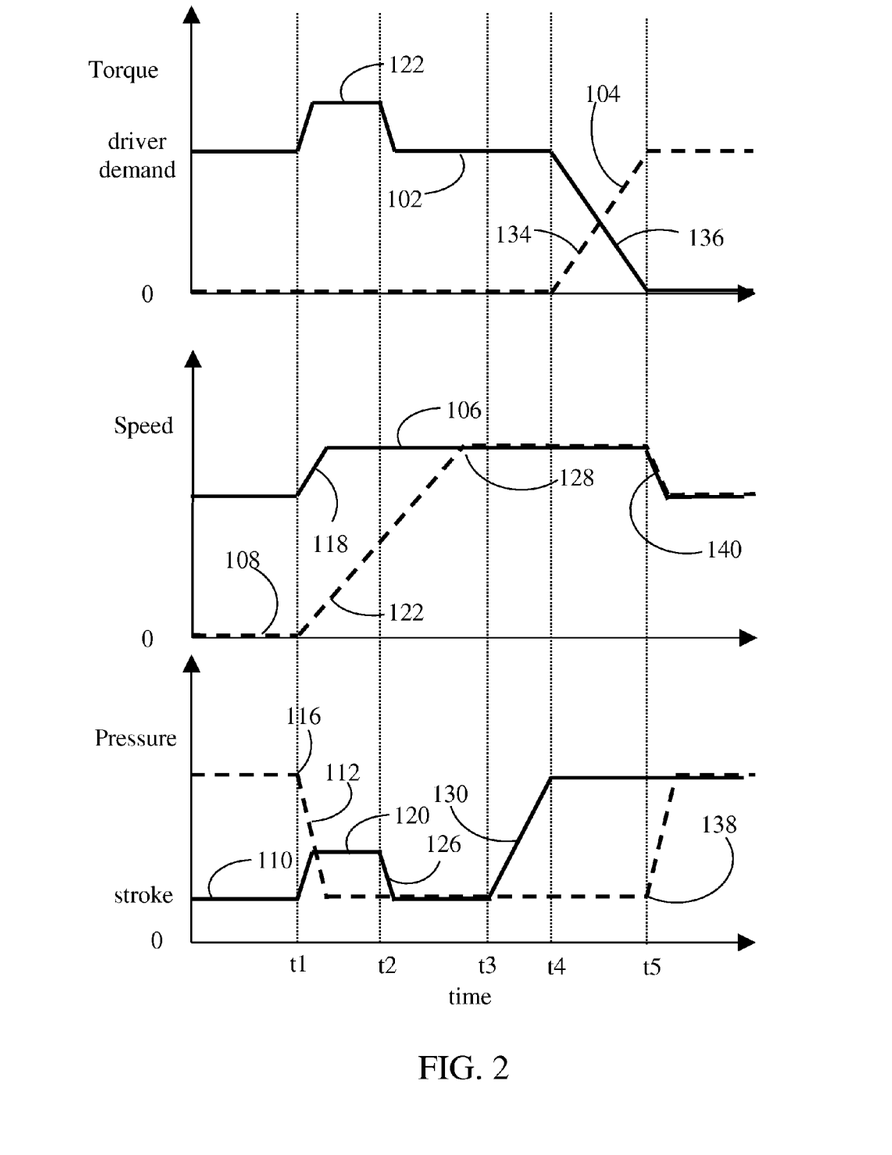
FIG. 2 is a series of graphs illustrating the relationships among torque, speeds, and clutch pressure during an engine start according to a first engine starting method.
Figure 3:
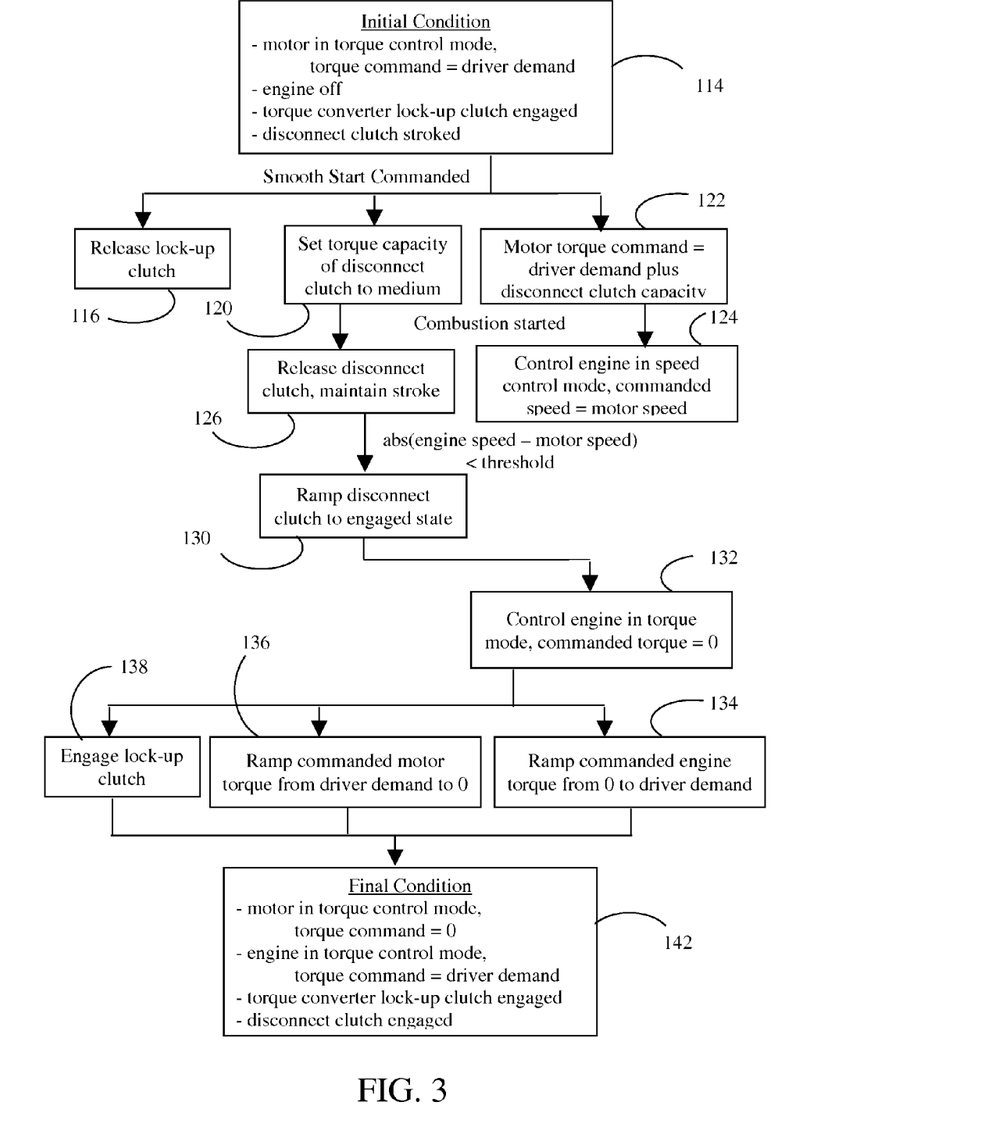
FIG. 3 is a flow chart illustrating the first engine starting method.

FIGS. 2 and 3 illustrate a method of starting engine 14 that is suitable when smoothness is paramount. Solid line 102 represents the torque produced by electric motor 18 while dotted line 104 represents the torque produced by internal combustion engine 14. Similarly, solid line 106 represents the shaft speed of electric motor 18 while dotted line 108 represents the crankshaft speed of internal combustion engine 14. Solid line 110 represents the pressure applied to disconnect clutch 26. If disconnect clutch 26 is not hydraulically actuated, then this graph should be interpreted as the torque capacity command of disconnect clutch 26. Finally, dotted line 112 represents the pressure applied to torque converter lock-up clutch 34.

In the initial condition 114, the vehicle is in electric only mode with torque converter lock-up clutch 34 fully engaged and gearbox 24 configured to transmit power from turbine shaft 32 to output shaft 36. Internal combustion engine 14 is off with the crankshaft not rotating. The pressure to disconnect clutch 26 is set at a level, called stroke pressure, at which the torque capacity of clutch 26 is negligible but the clutch is prepared to rapidly respond to further capacity increases by increasing the pressure.

At time t1, the controller begins the process of transitioning to hybrid mode. At 116, torque converter lock-up clutch 34 is released, causing the motor speed to increase slightly as shown at 118. Between t1 and t2, the pressure to disconnect clutch 26 is increased to an intermediate level as shown at 120. In response, disconnect clutch transmits some torque from motor 18 to engine 14. To maintain a constant level of torque to output shaft 36, the motor 18 is commanded to generate additional torque as shown at 120. The torque applied to engine 14 causes the engine speed to increase from zero as shown at 122.

At time t2, engine 14 reaches a speed at which combustion can be maintained and PCU 50 begins to provide fuel and spark. At 124, the PCU operates the engine actuators, such as throttle opening, spark timing, fuel flow rate, etc. in a speed control mode with a target speed. The target speed may be the projected motor speed based on the driver demand. At 126, between t2 and t3, the disconnect clutch is released and the torque of the motor returns to the level demanded by the driver. The engine speed continues to increase under its own power and levels out at 128 as it reaches the same speed as the motor. Up until time t3, the engine is not providing any power to the vehicle because the disconnect clutch 26 is released.

Between t3 and t4, disconnect clutch is gradually engaged as shown at 130. Output torque does not change as a result of this engagement because engine 14, operating in speed control mode, generates only enough torque to overcome its own internal resistance. At 132, the PCU begins controlling the engine in torque control mode. Between t4 and t5, the engine torque is ramped up to the driver demand level as shown at 134 and the motor torque is ramped down to zero as shown at 136 maintaining the total torque at the driver demand level. Between t1 and t5, the torque converter bypass clutch is at least partially open which has the effect of minimizing transmission of small torque fluctuations at shaft 30 to output shaft 36. Instead, small errors in torque result in slight acceleration or deceleration of motor 18 which the PCU can sense and correct. To complete the process, lock-up clutch 34 is re-engaged at 138 resulting in a slight decrease in engine and motor speeds as shown at 140. In final condition 142, the transition to hybrid mode is complete.

Figure 4:
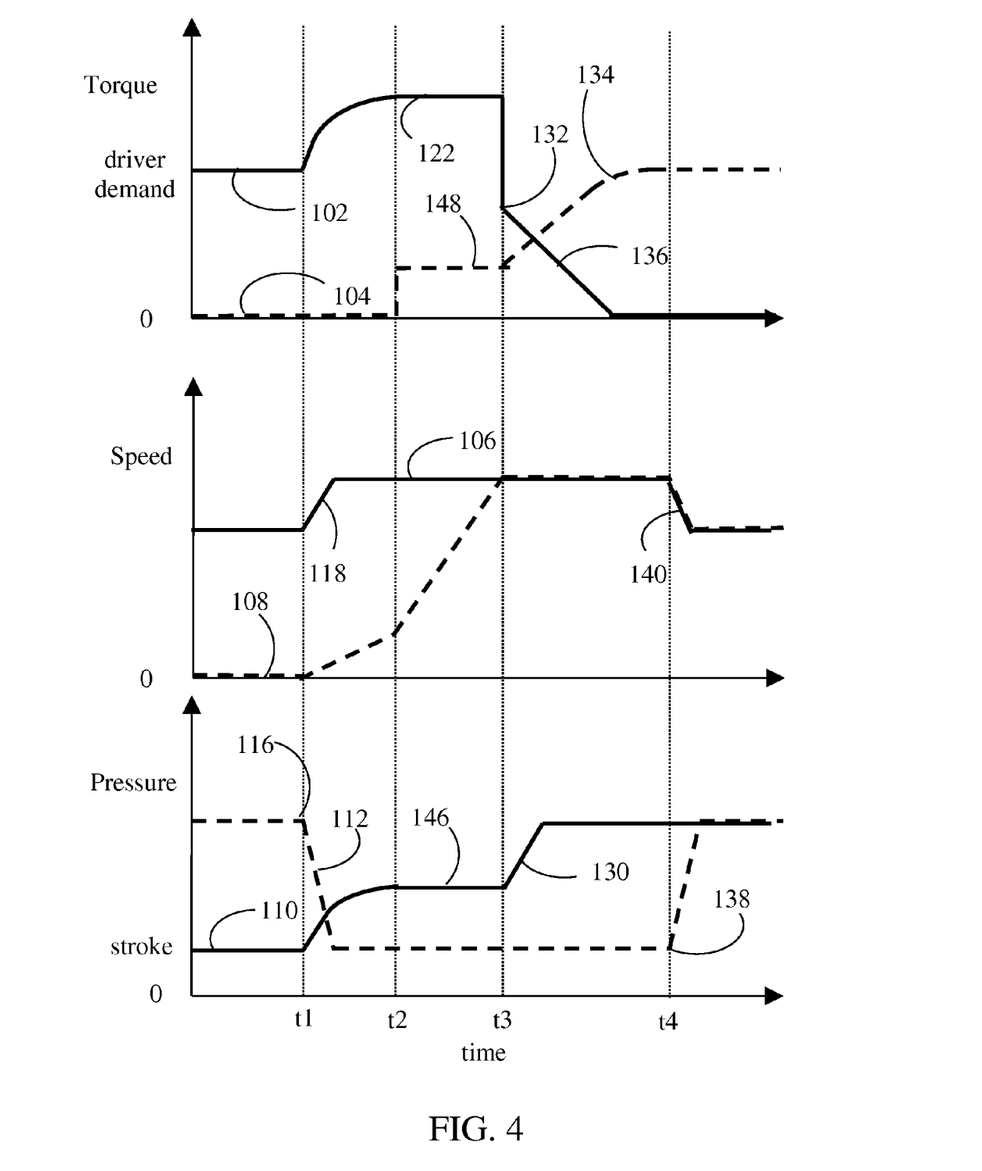
FIG. 4 is a series of graphs illustrating the relationships among torque, speeds, and clutch pressure during an engine start according to a second engine starting method.
Figure 5:
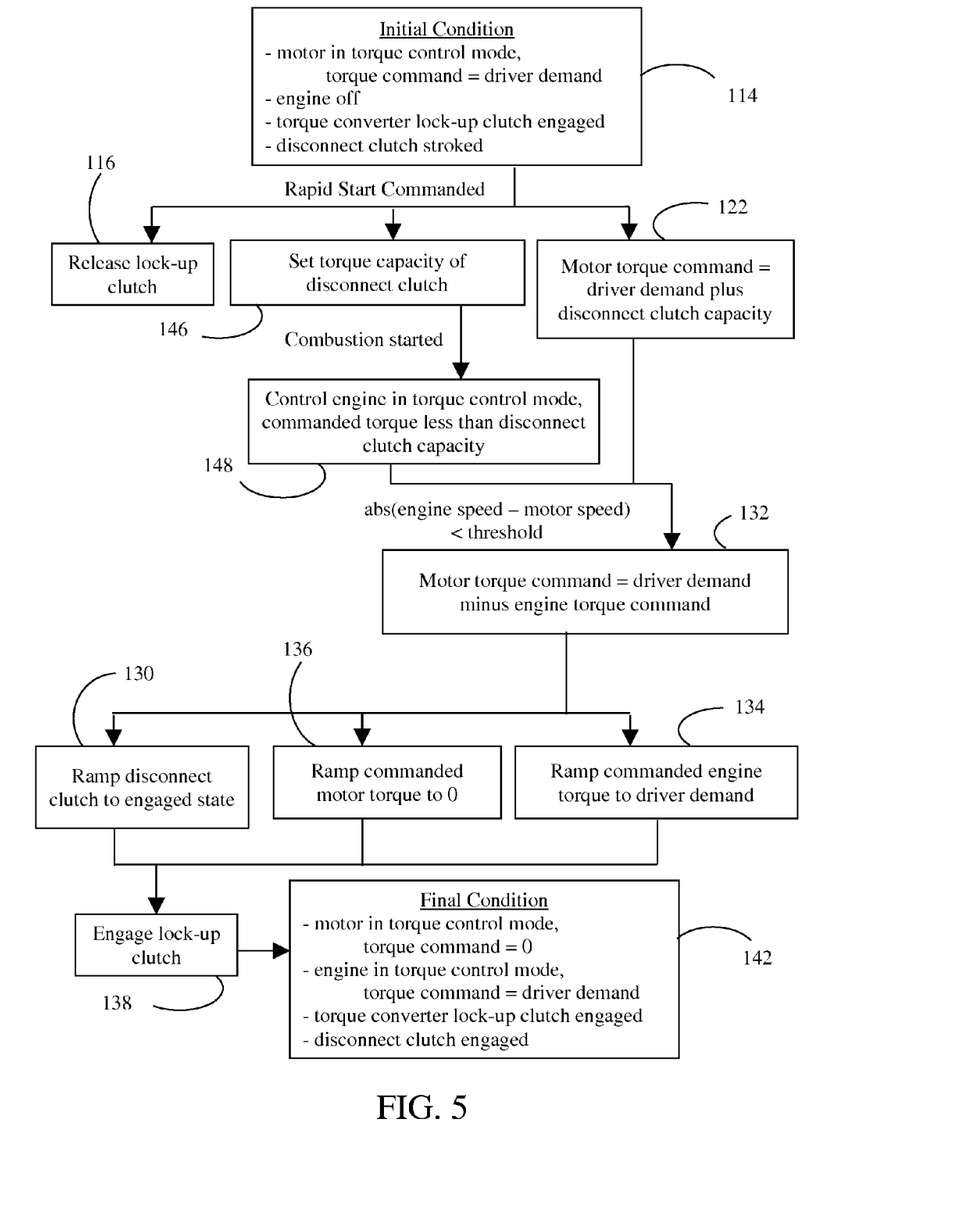
FIG. 5 is a flow chart illustrating the second engine starting method.

FIGS. 4 and 5 illustrate a method of starting engine 14 that is suitable when minimizing transition time is paramount. As in FIGS. 2 and 3, the initial condition has the vehicle is in electric only mode. At time t1, the controller begins the process of transitioning to hybrid mode. At 116, torque converter lock-up clutch 34 is at least partially released, causing the motor speed to increase slightly as shown at 118. At 146, between t1 and t3, the pressure to disconnect clutch 26 is set to a calibrated value such that engine speed increases from zero to the motor speed. As shown at 122, motor torque is increased by the disconnect clutch torque capacity such that the net torque remains constant at the driver demanded level. The calibrated value of disconnect clutch capacity is selected high enough to increase engine speed rapidly yet low enough that the motor has sufficient reserve torque to compensate. At time t2, engine 14 reaches a speed at which combustion can be maintained and PCU 50 begins to provide fuel and spark. Between t2 and t3, the engine is commanded in torque control mode at a commanded torque less than the disconnect clutch torque capacity as shown at 148.

Between t2 and t3, the engine speed continues to increase under both its own power and the effect of disconnect clutch 26. The engine speed reaches the motor speed faster in the process of FIGS. 4 and 5 than in the process of FIGS. 2 and 3 because both the disconnect clutch and the engine itself are providing torque to accelerate it. At t3, when the engine speed reaches the motor speed, the torque direction through disconnect clutch 26 will reverse. Disconnect clutch 26 now transmits torque from the engine to shaft 30. Because the engine torque is less than the disconnect clutch torque capacity, there is no tendency for the engine speed to overshoot the motor speed. At t3, the motor torque command is reduced to counteract the effect of the change in torque direction through disconnect clutch 26 as shown at 132. Between t3 and t4, the engine torque is ramped up to the driver demand level as shown at 134 and the motor torque is ramped down to zero as shown at 136. To complete the process, lock-up clutch 34 is re-engaged at 138 resulting in a slight decrease in engine and motor speeds as shown at 140.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a hybrid-electric-vehicle having an electric motor and an internal combustion engine selectively coupled by a disconnect clutch, the method comprising:
   propelling the vehicle with the electric motor while an engine speed is zero;
   partially engaging the disconnect clutch to increase the engine speed;
   disengaging the disconnect clutch and providing fuel to the engine while the engine speed is between zero and an idle speed; and
   fully engaging the disconnect clutch when the engine speed is substantially equal to a motor speed.

2. The method of claim 1 further comprising controlling the engine in a speed control mode with a target speed based on the motor speed after disengaging the disconnect clutch and before fully engaging the disconnect clutch.

3. The method of claim 1 further comprising:
disengaging a torque converter bypass clutch while partially engaging the disconnect clutch; and
engaging the torque converter bypass clutch after fully engaging the disconnect clutch.

4. The method of claim 3 further comprising controlling the engine in a torque control mode after engaging the torque converter bypass clutch.

5. A method of operating a hybrid-electric-vehicle comprising:
while an engine is not rotating, propelling the vehicle by using an electric motor to rotate a torque converter impeller faster than a torque converter turbine;
partially engaging a disconnect clutch to transmit torque from the electric motor to the engine to increase an engine speed; and
fully engaging the disconnect clutch when the engine speed is substantially equal to a motor speed.

6. The method of claim 5 further comprising engaging a bypass clutch to couple the torque converter turbine to the torque converter impeller.

7. The method of claim 5 further comprising controlling the engine in a torque control mode after fully engaging the disconnect clutch.

8. The method of claim 5 further comprising disengaging the disconnect clutch and providing fuel to the engine as the engine speed increases from zero towards an idle speed.

9. The method of claim 8 further comprising controlling the engine in a speed control mode with a target speed based on the motor speed after disengaging the disconnect clutch and before fully engaging the disconnect clutch.

10. The method of claim 5 further comprising controlling a torque capacity of the disconnect clutch at a first value and controlling a torque of the engine at a second value less than the first value as the engine speed increases from zero towards the motor speed.

11. The method of claim 10 further comprising decreasing a motor torque by an amount substantially equal to the sum of the first value and the second value when the engine speed reaches the motor speed.

12. A hybrid-electric-vehicle comprising:
an internal combustion engine;
an electric motor;
a disconnect clutch configured to selectively couple the engine to the motor;
a torque converter having a turbine and an impeller, the impeller driveably connected to the electric motor and the turbine driveably connected to vehicle wheels; and
a controller programmed to start the engine while the motor is propelling the vehicle by partially engaging the disconnect clutch to increase an engine speed and then fully engaging the disconnect clutch when the engine speed is substantially equal to a motor speed.

13. The hybrid-electric-vehicle of claim 12 further comprising a torque converter bypass clutch configured to selectively couple the turbine to the impeller and wherein the controller is further programmed to disengage the bypass clutch before starting the engine and to engage the bypass clutch after fully engaging the disconnect clutch.

14. The hybrid-electric-vehicle of claim 12 wherein the controller is further programmed to disengage the disconnect clutch and to provide fuel to the engine as the engine speed increases from zero towards an idle speed.

15. The hybrid-electric-vehicle of claim 14 wherein the controller is further programmed to control the engine in a speed control mode with a target speed based on the motor speed after disengaging the disconnect clutch and before fully engaging the disconnect clutch.

16. The hybrid-electric-vehicle of claim 12 wherein the controller is further programmed to control a torque capacity of the disconnect clutch at a first value and control a torque of the engine at a second value less than the first value as the engine speed increases from zero towards the motor speed.

* * * * *